US006824302B2

(12) United States Patent
Akizuki et al.

(10) Patent No.: US 6,824,302 B2
(45) Date of Patent: Nov. 30, 2004

(54) LAMP DEVICE FOR VEHICLE

(75) Inventors: Kunio Akizuki, Kanagawa (JP); Yasumitsu Nakabayashi, Kanagawa (JP)

(73) Assignee: Ichikoh Industries, Ltd., Tokyo (JP)

( * ) Notice: Subject to any disclaimer, the term of this patent is extended or adjusted under 35 U.S.C. 154(b) by 9 days.

(21) Appl. No.: 10/114,077

(22) Filed: Apr. 3, 2002

(65) Prior Publication Data

US 2002/0145883 A1 Oct. 10, 2002

(30) Foreign Application Priority Data

Apr. 4, 2001 (JP) ....................................... 2001-105302

(51) Int. Cl.[7] ................................................ B60Q 1/100

(52) U.S. Cl. ........................ 362/546; 362/547; 362/466; 362/467; 362/480; 362/512; 362/513; 362/526; 362/523; 362/539; 362/508; 362/285; 362/282

(58) Field of Search ................................ 362/546, 547, 362/466, 467, 480, 512, 513, 526, 523, 539, 508, 285, 282

(56) References Cited

U.S. PATENT DOCUMENTS 6,457,849 B2 * 10/2002 Tsukamoto ................. 362/509
6,478,459 B1 * 11/2002 Ui .............................. 362/512

FOREIGN PATENT DOCUMENTS

EP 1 052 448 A2 11/2000
JP 2001-035211 2/2001

* cited by examiner

*Primary Examiner*—Stephen Husar
*Assistant Examiner*—Bertrand Zead
(74) *Attorney, Agent, or Firm*—Foley & Lardner LLP

(57) ABSTRACT

Due to an effect of a solenoid of a moving mechanism, when a valve and a shutter are positioned at a first position, a light source is positioned at a first light source position and a shutter is in a state of closing a window. A lighting luminous flux from a light source is reflected by a reflector so as to be irradiated as a first light distribution pattern. Thus, a part of the lighting luminous flux is introduced to the reflector from the open window. Therefore, it is possible to effectively utilize the lighting luminous flux emitted from one valve in correspondence to a light distribution pattern.

22 Claims, 7 Drawing Sheets

LAMP DEVICE FOR VEHICLE

FIELD OF THE INVENTION

The present invention relates to a lamp device for vehicles in which it is possible to switch the light distribution pattern by moving the valve with respect to the reflector.

BACKGROUND OF THE INVENTION

A prior art lamp device of this type has been disclosed, for example, in Japanese Patent Application Laid-Open No. 2001-35211 (EP 1052448 A2).

The head lamp disclosed in the above-mentioned reference uses the high intensity discharge (HID) valve as a light source. This head lamp is configured such that it is possible to switch with a single HID valve between a light distribution pattern of a low beam and a light distribution pattern of a high beam, and securely prevent the glare.

SUMMARY OF THE INVENTION

It is an object of the invention to provide a lamp device which can effectively utilize a lighting luminous flux emitted from one valve in correspondence to a light distribution pattern.

The lamp device for vehicles according to one aspect of the present invention comprises a valve which emits a lighting luminous flux, a reflector which reflects the lighting luminous flux emitted from a light source of the valve, the reflector having an optic axis, a shade which covers a specific portions of the valve to restrict the lighting luminous flux falling on the reflector, and a valve holder which holds the valve, and a moving mechanism which moves the valve holder along the optical axis. A window is formed in the shade, there is provided a shutter which opens or closes the window base on the movement of the valve. A part of the lighting luminous flux is introduced to the reflector from the window when the shutter opens the window.

The lamp device for vehicles according to another aspect of the present invention comprises a reflector, a valve which has a single light source, a valve holder which holds the valve in the reflector so as to freely move in a direction of an optical axis, a fixed shade fixed to the valve holder and which has a window formed therein, a shutter which opens and closes the window, and a moving mechanism which moves the valve and the shutter in an interlocking manner between a first position and a second position. When the valve and the shutter are positioned at the first position, the light source is positioned at a first light source position, the shutter closes the window, and the lighting luminous flux from the light source is reflected by the reflector, whereby a first light distribution pattern is obtained. When the valve and the shutter are positioned at the second position, the light source is positioned at a second light source position, the shutter opens the window, and the lighting luminous flux from the light source is reflected by the reflector, whereby a second light distribution pattern is obtained.

Other objects and features of this invention will become apparent from the following description with reference to the accompanying drawings.

DETAILED DESCRIPTIONS

An embodiment of the lamp device according to this invention will be explain below with reference to the accompanying drawings.

The lamp device according to this invention is configured such as to be mounted to a motor vehicle sectioned in a left-hand traffic. Accordingly, a lamp device mounted to a motor vehicle sectioned in a right-hand traffic can be configured so as to be mirror reversed with respect to the lamp device according to this embodiment.

Figure 1A:
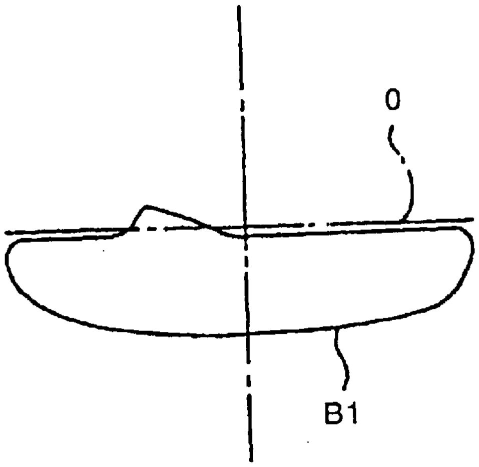
FIG. 1A is an explanatory diagram of a light distribution pattern when the beam is set low which shows a lamp device according to an embodiment of the present invention.
Figure 1B:
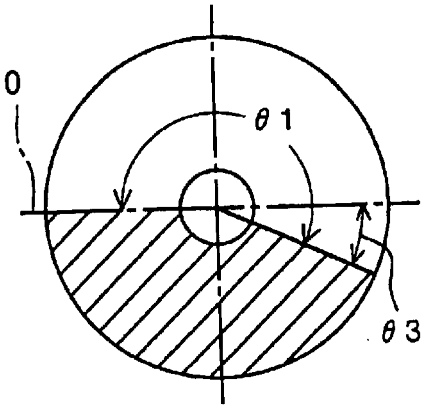
FIG. 1B is an explanatory diagram along a line B—B in FIG. 1C, which shows a reflection range of a lighting luminous flux in a reflector.
Figure 1C:
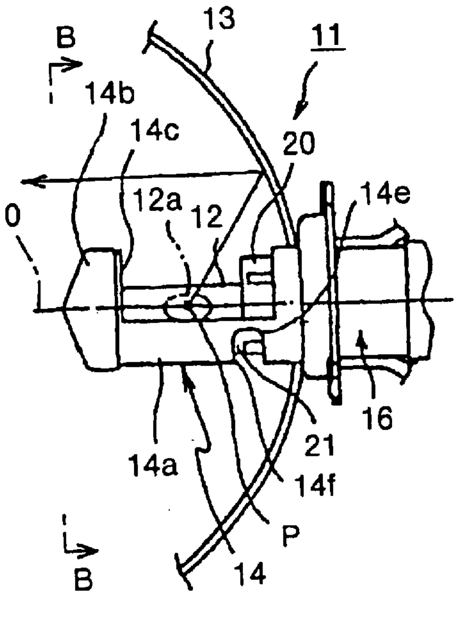
FIG. 1C is an explanatory diagram which shows a relationship among a valve, a window and the reflector when the beam has been set low.
Figure 2A:
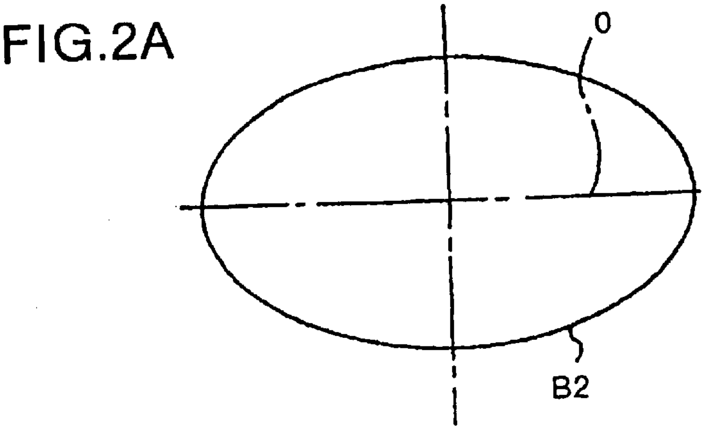
FIG. 2A is an explanatory diagram of a light distribution pattern when the beam is set high which shows a lamp device according to an embodiment of the present invention.
Figure 2B:
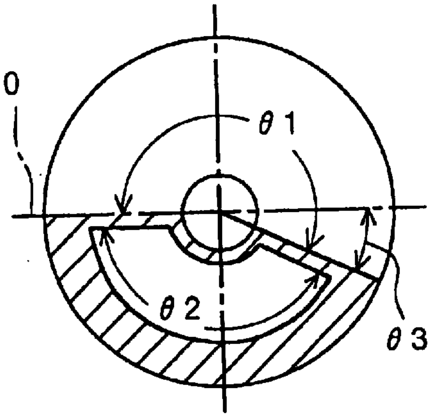
FIG. 2B is an explanatory diagram along a line B—B in FIG. 2C, which shows a reflection range of a lighting luminous flux in a reflector.
Figure 2C:
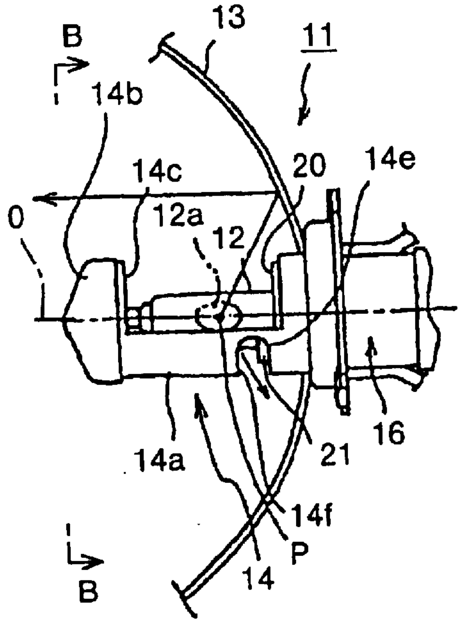
FIG. 2C is an explanatory diagram which shows a relationship among a valve, a window and the reflector when the beam has been set high.

FIG. 1A is an explanatory diagram of a light distribution pattern when the beam is set low which shows a lamp device according to an embodiment of the present invention. FIG. 1B is an explanatory diagram along a line B—B in FIG. 1C, which shows a reflection range of a lighting luminous flux in a reflector. FIG. 1C is an explanatory diagram which shows a relationship among a valve, a window and the reflector when the beam has been set low. FIG. 2A is an explanatory diagram of a light distribution pattern when the beam is set high which shows a lamp device according to an embodiment of the present invention. FIG. 2B is an explanatory diagram along a line B—B in FIG. 2C, which shows a reflection range of a lighting luminous flux in a reflector. FIG. 2C is an explanatory diagram which shows a relationship among a valve, a window and the reflector when the beam has been set high.

As shown in FIGS. 1A to 1C and FIGS. 2A to 2C, the lamp device 11 is provided with a valve 12 which emits a lighting luminous flux, a reflector 13 which reflects the lighting luminous flux emitted from the valve 12, a shade (fixed shade) 14 which restricts the lighting luminous flux outgoing to the reflector 13 by covering a predetermined range of the valve 12, and a drive section case 16 held in a valve holder (not shown) which mounts the valve 12 thereto and integrally or independently provided in the reflector 13.

Figure 3A:
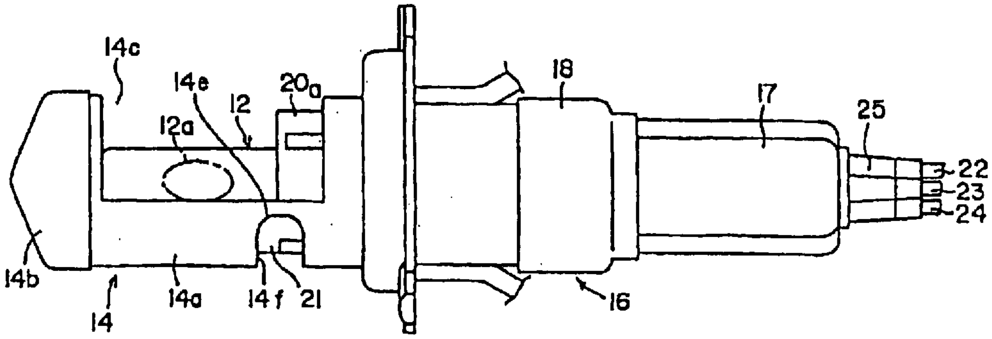
FIG. 3A is a side elevational view which shows a valve peripheral configuration when the beam has been set low.
Figure 3B:
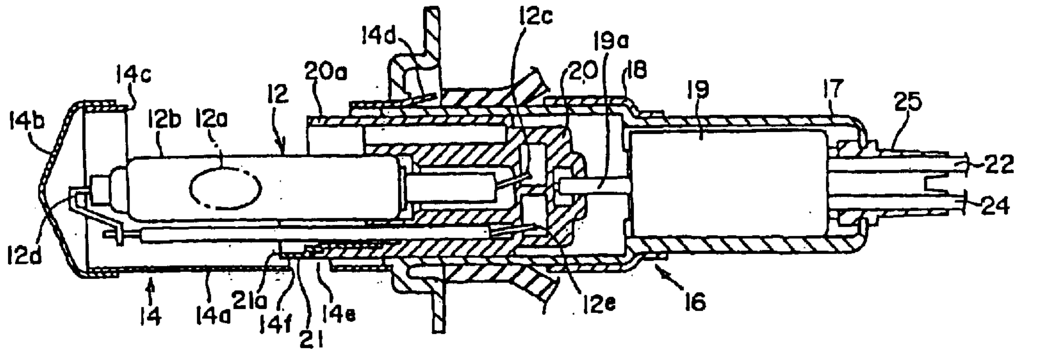
FIG. 3B is a vertical cross sectional view which shows the valve peripheral configuration when the beam has been set low.
Figure 4A:
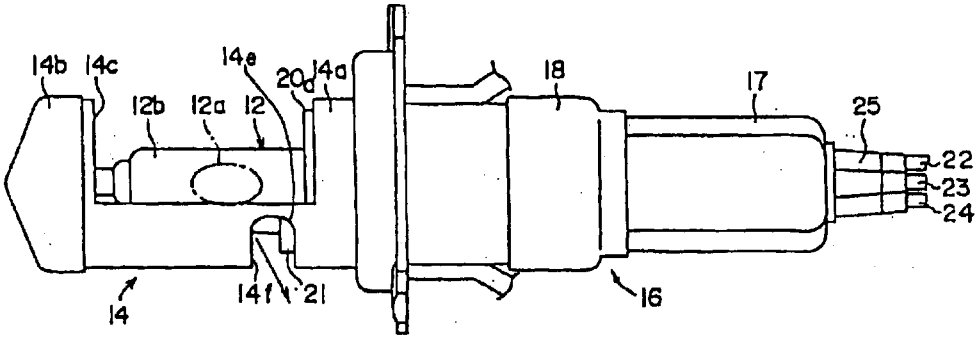
FIG. 4A is a side elevational view which shows the valve peripheral configuration when the beam has been set high in the same manner.
Figure 4B:
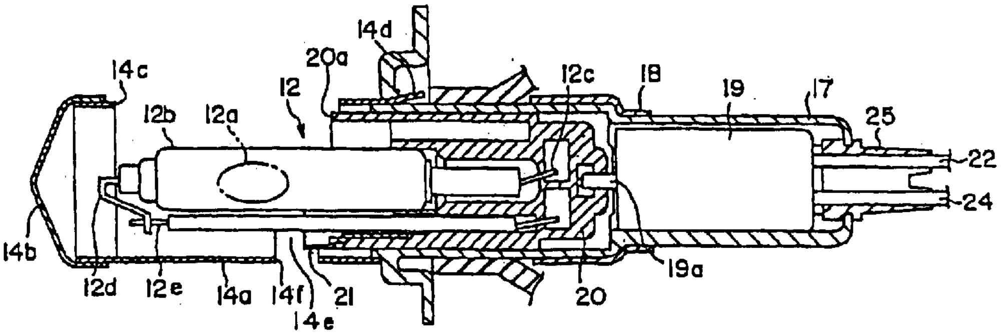
FIG. 4B is a vertical cross sectional view which shows the valve peripheral configuration when the beam has been set high.

The valve 12 may be the HID valve (also called as a discharge lamp or a xenon arc lamp) corresponding to a standard of H4 valve, an H12 valve or the like. For explanation purpose, it will be assumed that the valve 12 is the HID valve corresponding to the standard of the H4 valve. The valve 12 is, as shown in FIGS. 3B and 4B, provided with a glass vessel 12*b* internally provided with a light emitting section (single light source) 12*a*, a power source line 12*c* in which a front end D1 (refer to FIGS. 6 and 7) is connected to one end of the light emitting section 12*a* and a base end is protruded from a base end of the glass vessel 12*b*, a power source line 12*d* in which a base end D2 (refer to FIGS. 6 and 7) is connected to another end of the light emitting section 12*a* and a front end is protruded from a front end of the glass vessel 12*b*, and an earth line 12*e* connected to a front end of the power source line 12*d*.

The reflector 13 is formed in a free curved surface around an optical axis O corresponding to a center axis, or in a rotation parabolic surface or the like, and the surface is set to a reflection surface. When the light emitting section 12*a* is at a low beam position (details are described later), the lighting luminous flux emitted from a center P of the light source (light emitting section 12*a*) is reflected by the reflector 13, whereby a light distribution pattern B1 of the low beam shown in FIG. 1A is obtained. Further, when the light emitting section 12*a* is at a high beam position (details are described later), the lighting luminous flux emitted from the light source center P is reflected to the reflector 13, whereby a high beam light distribution pattern B2 shown in FIG. 2A is obtained.

Figure 5A:
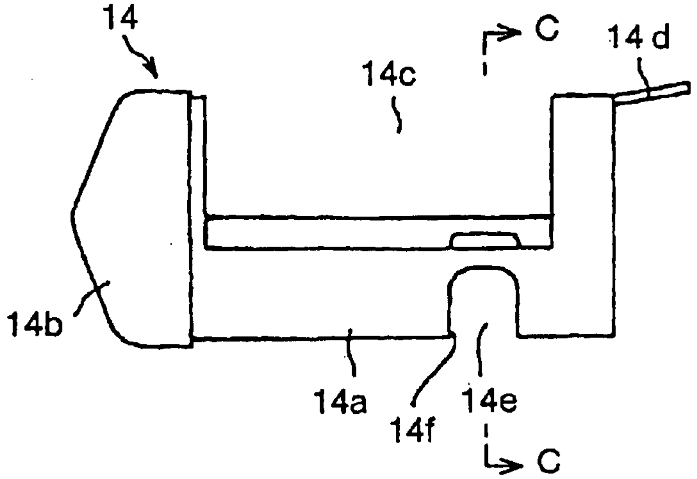
FIG. 5A is a side elevational view of a shade.
Figure 5B:
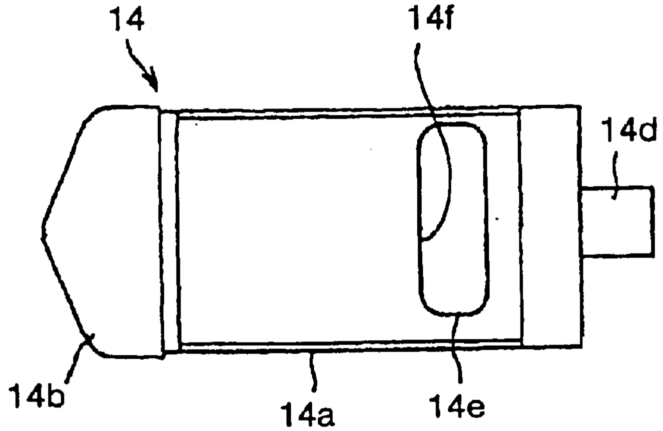
FIG. 5B is a plan view of a shade.

The shade 14 is provided, as shown in FIGS. 5A and 5, with a shade main body 14*a* which has a circular arc shape of the like positioned below the optical axis O of the valve 12, and a cap 14*b* emitted from a front end of the valve 12 and which shuts the lighting luminous flux directly outgoing to a lens which is omitted to be shown. The cap 14*b* commonly serves as a blindfold making the front end of the valve 12 invisible from the external section.

Figure 5C:
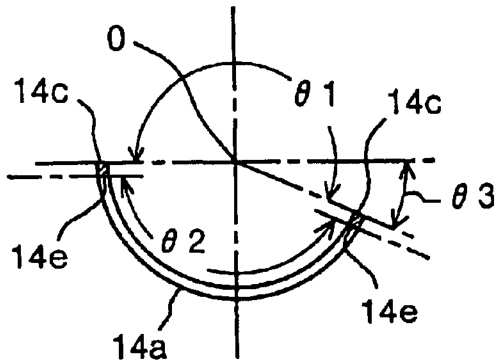
FIG. 5C is a cross sectional view along a line A—A in FIG. 5A.

The shade main body 14*a* is provided for the purpose of shutting the lighting luminous flux forming an upward glare light due to the reflection in the lower section of the reflector 13, that is, the lighting luminous flux outgoing from the valve 12 toward the lower side of the reflector 13. An opening 14c for opening from a section slightly below the optical axis O toward an upper section, and a window 14*e* formed substantially all the width in a width direction are respectively opened in the shade main body 14*a*. Further, a hook section 14*d* fixed to a drive section case 16 is integrally formed in the shade main body 14*a*. One (which becomes reverse in correspondence to a placing position in right and left of a vehicle) of cut lines in both sides of the opening 14*c* is an angle of center θ3 down from the horizontal line, as shown in FIG. 5C. Accordingly, an area θ3 moving downward from the horizontal line including the optical axis O in an effective reflection area θ1 shown in FIGS. 1B and 2B is determined (in this embodiment, θ3=15 degrees).

The drive section case 16 corresponds to a valve holder which has a moving mechanism. The drive section case 16 is provided with a substantially closed-end cylindrical holder 17 which opens the valve 12 side, a waterproofing tube 18 which covers an opening (not shown) formed in the holder 17, a solenoid 19 provided in an inner section in aside of a base section of the holder 17, a slider 20 provided in an inner section in a side of a front end of the holder 17 and connected to an axis 19*a* of the solenoid 19 so as to move along a direction of the optical axis within the holder 17, and a shutter 21 fixed to the slider 20.

The valve 12 is fixed to the slider 20. As a result, the valve 12 is held in the reflector 13 via the valve holder so as to freely move in the direction of the optical axis. The shade 14 is fixed to the holder 17.

The solenoid 19 employs a two-way solenoid. This solenoid 19 is configured such that the axis 19*a* contracting from an extended state (a state shown in FIG. 3B) and on the contrary the axis 19*a* extends from the contracting state (a state shown in FIG. 4B), when an electric current is supplied. The solenoid 19 is configured such that the axis 19*a* extends so as to stop at a predetermined position (a position shown in FIG. 3B), and on the contrary the axis 19*a* contracts so as to stop at a predetermined position (a position shown in FIG. 4B). The solenoid 19 is configured such that it is not necessary to supply the electric current thereto because the stop state is kept by an internal magnet after the axis 19*a* stops at the predetermined position. Accordingly, since the lamp device need only a small amount of electric power and is required to supply the electric current for a shorter time, the solenoid 19 is not heated within the holder 17.

Electric power supplying wiring cords 22 to 24 for supplying the electric current are connected to the solenoid 19. In the wiring cords 22 to 24, an airtight property between the interior section of the holder 17 and the external section is kept by a guide packing 25. Further, a waterproof property is kept by a waterproofing tube 18. Accordingly, the solenoid 19 in the internal section is not affected by the water.

Figure 6:
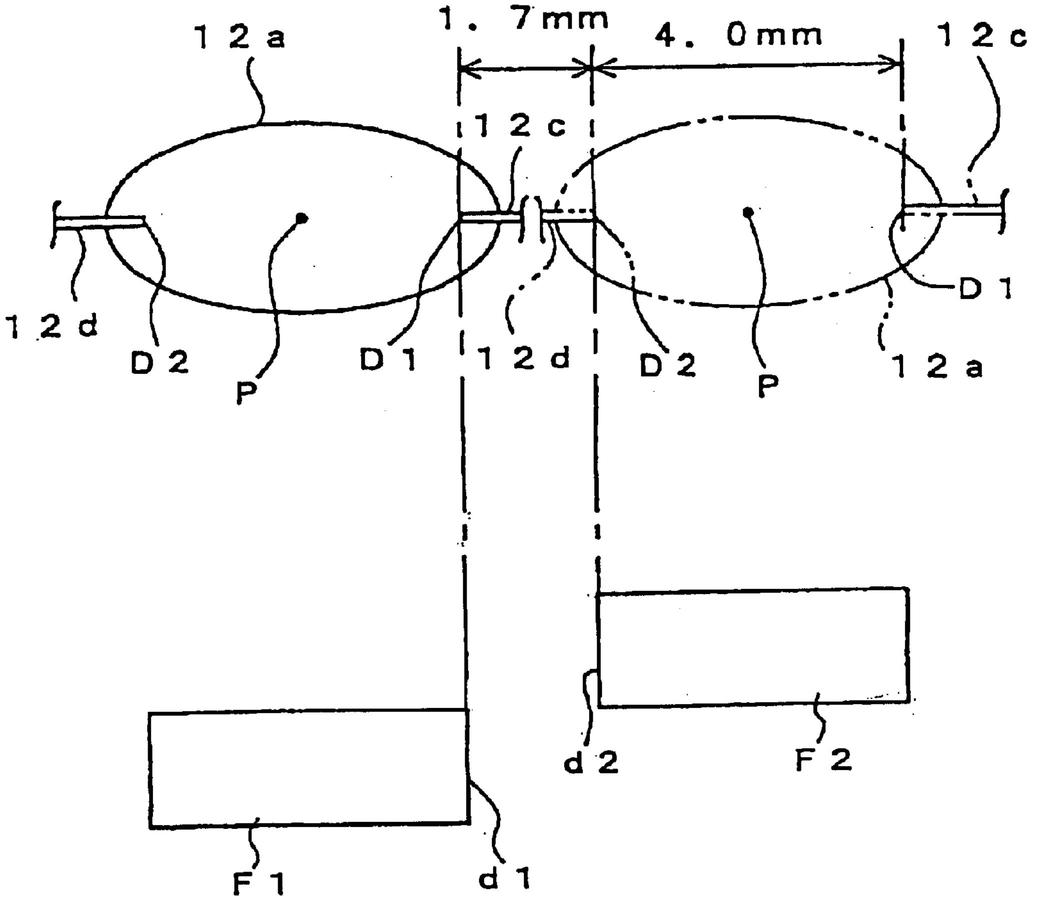
FIG. 6 is an explanatory diagram which compares a moving position of a light source between a HID valve and an H4 valve with double filaments in the same manner, that is, an explanatory diagram which shows a relationship between the position of the light source at a time when the HID valve is at the low beam and the high beam, and positions of the respective filaments of the H4 valve.

An oscillating amount of the axis 19*a* of the solenoid 19 is made substantially coincide with an apart distance (standard) between the filaments F1 and F2 of the so-called double filament type H4 valve, as shown in FIG. 6. That is, in the valve 12, it is set such that a distance between a front end D1 of a lead wire 12*c* at a time when the light emitting section 12*a* is positioned (shown by a solid line in FIG. 6) at the low beam position (the first light source position), and a base end D2 of a lead wire 12*d* at a time when the light emitting section 12*a* is positioned (shown by a double-dot chain line in FIG. 6) at the high beam position (the second light source position) becomes 1.7 mm. On the contrary, in the valve 12, a distance between front ends of the respective lead wires 12*c* and 12*d* is standardized and set to 4.0 mm. As a result, a moving amount of the axis 19*a* of the solenoid 19 is 1.7+4.0=5.7 mm.

A position of the front end D1 of the lead wire 12*c* at a time when the light emitting section 12*a* is positioned at the low beam position coincides with a position of a virtual base end surface d1 of the filament F1. Further, a position of the base end D2 of the lead wire 12*d* at a time when the light emitting section 12*a* is positioned at the high beam position coincides with a position of a virtual base end surface d2 of the filament F2. Therefore, it is possible to replace the H4 valve and the valve 12 (including the drive section case 16 corresponding to the shade 14 and the valve holder) with each other. In other words, the reflector 13 can be commonly used between the valve 12 and the H4 valve.

A "play" allowing a relative change of angle, that is, a change of angle of the axis 19*a* is provided between the slider in the side of the valve 12 and the shutter 21, and holder 17 in the side of the valve holder. The "play" is configured such that even when the axis 19*a* does not necessarily coincide with the optical axis O due to a mounting state of the solenoid 19, it is possible to securely transmit the drive force of the solenoid 19 to the slider 20. Therefore, it is possible in the lamp device to slide the valve 12 fixed to the slider 20 in the direction of the optical axis O (a longitudinal direction, that is, a lateral direction in the drawing) by driving the solenoid 19.

A valve rear shade section 20*a* extended to a rear upper section of the valve 12 is integrally formed in an upper section of the front end of the slider 20. The valve rear shade section 20*a* is provided for the purpose of shielding the light diffusing obliquely rearward from the valve 12 on the basis of a predetermined light distribution property. The valve rearward shade section 20*a* integrally moves with the valve 12 interlocking with the operation of the solenoid 19. Therefore, it is possible in the lamp device to always shield the light diffusing obliquely rearward from the valve 12 on the basis of the same light distribution property.

The shutter 21 is provided with a width larger than that of the window 14*e*, and is formed so as to cover an upper section (inner side) of the window 14*e* in cooperation with the slider 20 at a time when the axis 19*a* is in an extending state. The shutter 21 opens at least an upper section (inner side) close to a front section of the window 14*e* at a time when the axis 19*a* is in a contracting state.

The lamp device according to this embodiment has the configuration mentioned above, and an operation thereof will be explained below.

The state in which the axis 19*a* extends due to the operation of the solenoid 19 corresponds to the light distribution state of the low beam. At this time, the valve 12 and the shutter 21 are positioned at the first position, as shown in FIGS. 1A and 3A. The light emitting section 12*a* is positioned at the first light source position, as shown by a solid line in FIG. 6. That is, the light emitting position 12*a* is positioned at a position apart from the reflector 13, and on the contrary, the window 14*e* is closed. As a result, as shown in FIG. 1B, a part of the lighting luminous flux emitted from the valve 12 is shielded by the shade 14 and the shutter 21, whereby the lighting luminous flux is reflected by utilizing the effective reflection area θ1 slightly protruding from the horizontal position including the optical axis O in all the reflection area (360 degrees) of the reflector 12 (a protruding direction is different in correspondence to setting in right or left of the vehicle body), transmits through a lens (not shown), and lights up the forward section of the vehicle body on the basis of the light distribution pattern mainly having the lower section of the horizontal line including the optical axis O (the light distribution pattern of the low beam).

The state in which the axis 19*a* contracts due to the operation of the solenoid 19 corresponds to the light distribution state of the high beam. At this time, the valve 12 and the shutter 21 are positioned at the second position, as shown in FIGS. 2A to 2C and FIGS. 4A and 4B. The light emitting section 12*a* is positioned at the second light source position. That is, the light emitting position 12*a* is positioned at a position close to the reflector 13, and on the contrary, the window 14*e* is opened. As a result, as shown in FIG. 2B, a part of the lighting luminous flux emitted from the valve 12 is shielded by the shade 14, whereby the lighting luminous flux is reflected by utilizing the effective reflection area θ1 and simultaneously transmits through the window 14*e*, thereby being reflected by utilizing the second effective area θ2, transmits the lens (not shown), and lights up the forward section of the vehicle body on the basis of the light distribution pattern straddling substantially in all the circumferential direction (the light distribution pattern of the high beam), as shown in FIG. 2A.

Therefore, the lamp device according to this embodiment can easily light up a near side in the forward section of the vehicle body in spite of the light distribution state of the high beam, and can effectively utilize the lighting luminous flux.

The shutter 21 is fixed to the slider 20. Therefore, the lamp device according to this embodiment is not necessarily provided with a specific moving mechanism (for example, a solenoid, a pulse motor, a control circuit and the like) which moves the shutter 21, it is possible to improve an accuracy of relative position between the light source position and the shutter, it is possible to prevent a turbulence of the light distribution from being generated by the movement of the shutter, and it is possible to inexpensively and securely achieve an effective utilization of the high beam light distribution state.

Figure 7:
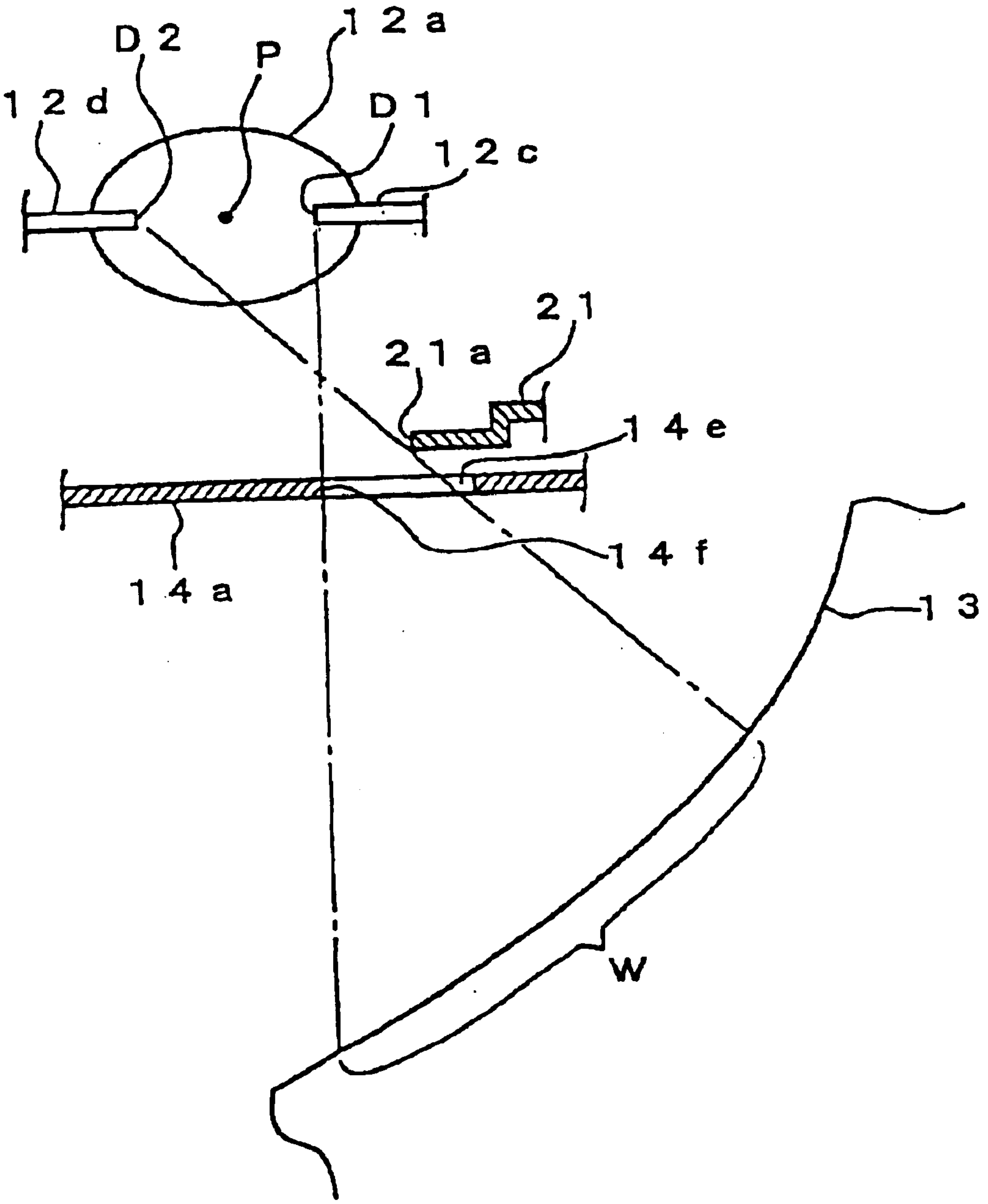
FIG. 7 is an explanatory diagram which shows a relationship of relative positions among the light source, the window and the reflector in a state in which the window is open, in the same manner.

Since the lamp device according to this embodiment is configured, as shown in FIG. 7, such that a light source center (a center of the light emitting section 12*a*) P is positioned in a forward side from an edge section 14*f* of the window 14*e* under the open state, it is possible to utilize a reflector section W which is farthest from the light source center P and has a lot of luminous flux as the effective reflection surface. In particular, since it is impossible to set the window 14*e* to be large in the configuration in which the moving amount of the valve is set to be small, it is advantageous in view of the configuration by utilizing the reflector section W in which the amount of luminous flux is most. Further, in the lamp device according to this embodiment, as shown by a solid line in FIG. 6, when the configuration is made such that the edge section 14*f* in the forward side of the window 14*e* is positioned on a vertical line of the front end D1 of the lead wire 12*c*, it is possible to further effectively utilize a depth range W which passes through the window 14*e* without being shielded by the front end 21*a* of the shutter 21 from the base end D2 of the lead wire 12*d* so as to reach the base section side of the reflector 13. According to this invention, the configuration may be made such that the window 14*e* is arranged below the valve 12.

The lamp device according to this embodiment can securely prevent an exposure by positioning the front end 21*a* of the shutter 21 when closing the window 14*e* in the side of the lighting direction rather than the window 14*e* so as to overlap with the shade main body 14*a*. In order to more securely prevent the exposure, the configuration may be made such as to overlap in a state of moving the shutter 21 apart from the shade main body 14*a*.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A lamp device for vehicles comprising:

a valve which emits a lighting luminous flux;

a reflector which reflects the lighting luminous flux emitted from a light source of the valve, the reflector having an optical axis;

a shade which covers specific portions of the valve to restrict the lighting luminous flux falling on the reflector;

a valve holder which holds the valve; and a moving mechanism which moves the valve holder along the optical axis;

wherein a window is formed in the shade, there is provided a shutter which opens or closes the window based on the movement of the valve, wherein a part of the lighting luminous flux is introduced to the reflector from the window when the shutter opens the window.

2. The lamp device according to claim 1, wherein the shutter is fixed to the moving mechanism.

3. The lamp device according to claim 1, wherein the valve is an HID valve, and moving positions of the light source substantially coincide with positions of the respective filaments in a double filament type valve.

4. The lamp device according to claim 1, wherein the window is arranged in a lower section of a body of the vehicle from the light source, and a center of the light source, at a time when the valve and the shutter move so as to open the window, is positioned in a side in a lighting direction from an edge section positioned close to the lighting direction of the window.

5. The lamp device according to claim 1, wherein the front end of the shutter overlaps from the window so as to overlap with the shade when closing the window by the shutter.

6. The lamp device according to claim 1, wherein the moving mechanism of the valve holder is constituted by a two-way solenoid.

7. The lamp device according to claim 1, wherein a waterproofing tube is provided in the valve holder.

8. The lamp device according to claim 1, wherein a play allowing a relative change of angle is provided between a side of the valve and the shutter, and a side of the valve holder.

9. The lamp device according to claim 1, wherein a valve rear shade section which moves integrally with the valve is integrally formed in the moving mechanism.

10. A lamp device for vehicles comprising:

a reflector;

a valve which has a single light source;

a valve holder which holds the valve in the reflector so as to freely move in a direction of an optical axis;

a fixed shade fixed to the valve holder and which has a window formed therein;

a shutter which opens and closes the window; and a moving mechanism which moves the valve and the shutter in an interlocking manner between a first position and a second position, wherein when the valve and the shutter are positioned at the first position, the light source is positioned at a first light source position, the shutter closes the window, and the lighting luminous flux from the light source is reflected by the reflector, whereby a first light distribution pattern is obtained, and wherein when the valve and the shutter are positioned at the second position, the light source is positioned at a second light source position, the shutter opens the window, and the lighting luminous flux from the light source is reflected by the reflector, whereby a second light distribution pattern is obtained.

11. The lamp device according to claim 10, wherein the shutter is fixed to the moving mechanism.

12. The lamp device according to claim 10, wherein the valve is an HID valve, the first light source position substantially coincides with a position of a first filament in a double filament type valve, and the second light source position substantially coincides with a position of a second filament in the double filament type valve.

13. The lamp device according to claim 10, wherein the window is arranged in a lower section of a vehicle body from the light source, and a center of the light source, at a time when the window is open, is positioned in a side in a lighting direction from an edge section in the lighting direction of the window.

14. The lamp device according to claim 10, wherein the shutter overlaps with the shade in the edge of the window at a time when the window is closed.

15. The lamp device according to claim 10, wherein the moving mechanism of the valve holder is constituted by a two-way solenoid.

16. The lamp device according to claim 10, wherein a waterproofing tube is provided in the valve holder.

17. The lamp device according to claim 10, wherein a play allowing a relative change of angle is provided between a side of the valve and the shutter, and a side of the valve holder.

18. The lamp device according to claim 10, wherein a valve rear shade section which moves integrally with the valve is integrally formed in the moving mechanism.

19. The lamp device according to claim 1, wherein the shade comprises a cap emitted from a front end of the valve, wherein when the moving mechanism moves the valve holder along the optical axis, the cap remains stationary.

20. A lamp device for vehicles comprising:

a valve which emits a lighting luminous flux;

a reflector which reflects the lighting luminous flux emitted from a light source of the valve, the reflector having an optical axis;

a shade which covers specific portions of the valve to restrict the lighting luminous flux falling on the reflector; and a valve holder which holds the valve, the valve holder being movable along the optical axis;

wherein a window is formed in the shade, there is provided a shutter which opens or closes the window based on the movement of the valve, wherein a part of the lighting luminous flux is introduced to the reflector from the window when the shutter opens the window.

21. The lamp device according to claim 1, wherein the shutter moves to open or close the window based on the movement of the valve.

22. The lamp device according to claim 20, wherein the shutter moves to open or close the window based on the movement of the valve.

* * * * *